March 2, 1926.
F. T. RUNDELL
GREASE GUN
Filed May 23, 1921
1,575,080
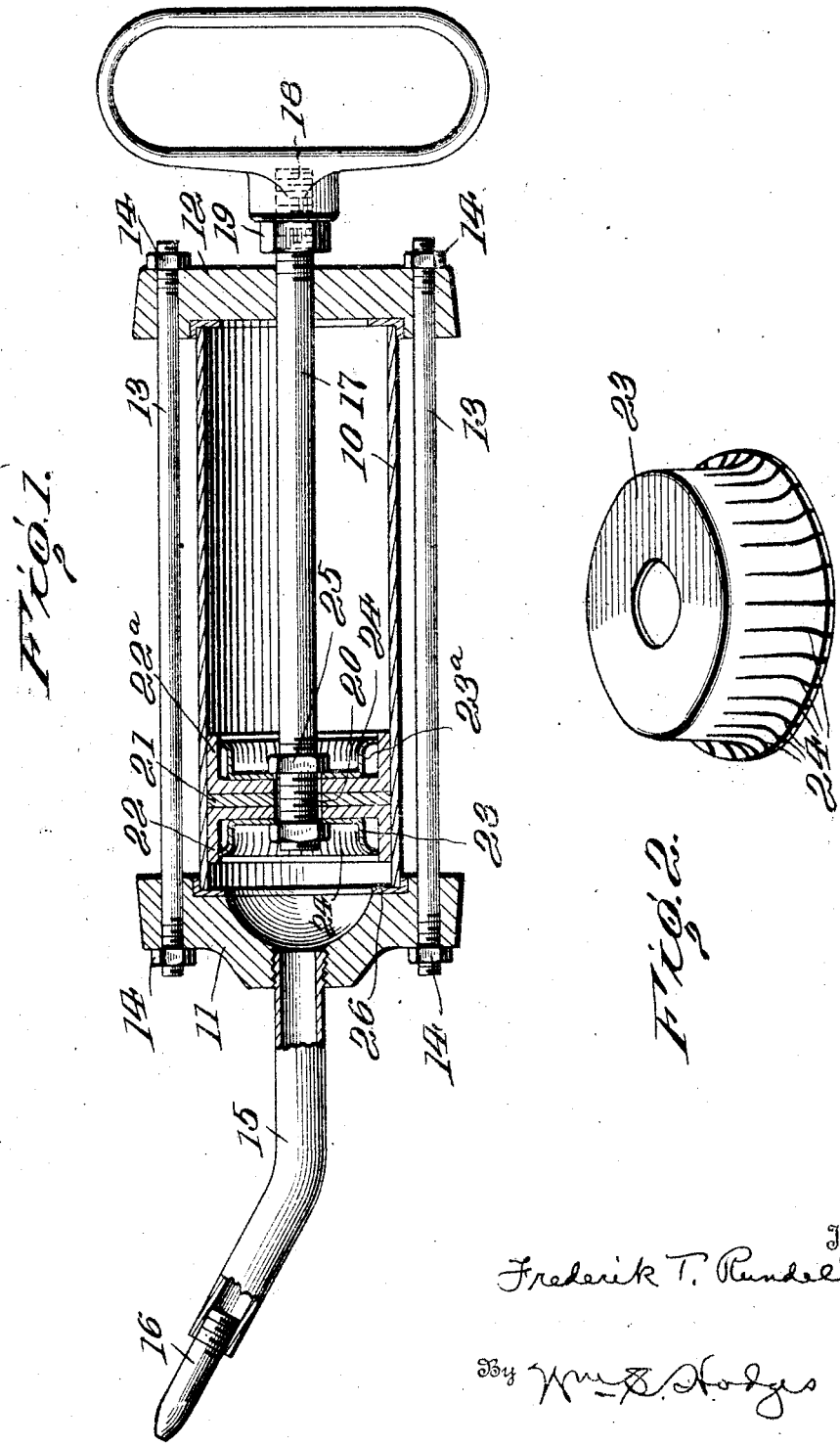
Inventor
Frederick T. Rundell
By Wm. S. Hodges
Attorney Patented Mar. 2, 1926.

1,575,080

UNITED STATES PATENT OFFICE.

FREDERICK T. RUNDELL, OF MORGANTOWN, WEST VIRGINIA, ASSIGNOR TO MONONGAHELA SUPPLY COMPANY, OF MORGANTOWN, WEST VIRGINIA, A CORPORATION OF WEST VIRGINIA.

GREASE GUN.

Application filed May 23, 1921. Serial No. 471,719.

*To all whom it may concern:*

Be it known that I, FREDERICK T. RUNDELL, a citizen of the United States, residing at Morgantown, in the county of Monongalia and State of West Virginia, have invented a new and useful Grease Gun, of which the following is a specification.

This invention is a device for facilitating the filling of grease cups and other lubricating devices, and for conveniently delivering an adequate supply of lubricant to any moving part of a mechanism, no matter how inaccessible said part may be.

One of the objects of the invention is to provide a device of simple construction, having means by which the lubricant receptacle may be filled through the nozzle of the device, whereby opening of said receptacle is rendered unnecessary. A further object is to provide a device of simple construction, and of maximum strength, having efficient means for expelling lubricant.

The invention will be hereinafter fully set forth and particularly pointed out in the claims.

In the accompanying drawing:—

Figure 1 is a longitudinal sectional view illustrating a grease gun constructed in accordance with the invention. Figure 2 is a detail perspective view illustrating one of the spring metal cups.

Referring to the drawing, 10 designates a cylindrical casing constructed of metal, the ends thereof being closed by heads 11 and 12 respectively, connected by tension rods 13, which pass through suitable openings in the end heads, and which are engaged by nuts 14. The end head 11 is provided with a threaded opening in which is removably mounted a discharge tube 15, which is internally threaded at its outer end to receive a correspondingly threaded portion of a nozzle 16.

The end head 12 is provided with an opening for the passage of a piston rod 17. The outer end of said rod is threaded, and is engaged by a correspondingly threaded portion of a handle 18, a lock nut 19 being preferably provided to prevent accidental disconnection. The inner end of the rod 17 is threaded as indicated at 20, and passed loosely through an opening in a metal piston disk 21, which latter lies between cup-shaped washers 22, 22$^a$ engaging the walls of the casing 10. Located within the washers 22 and 22$^a$ are spring metal cups 23, 23$^a$ each having slit portions 24, which provide outturned spring tongues shaped to bear against the inner walls of the cup-shaped washers, and to force the latter into close contact with the wall of the receptacle 10. It will be observed that the cups 23 and 23$^a$ are provided with walls approximately parallel with the walls of the cups 22 and 22$^a$, respectively, and that the peripheral edges of the said metal cups are turned outwardly approximately at right angles into engagement with the piston cup walls, the slits being so disposed as to form a plurality of spring tongues which provide substantially continuous outwardly acting backings for the walls of the piston cups. The washers 22, 22$^a$ and the cups 23, 23$^a$ are provided with registering openings through which the piston rod 17 extends, all of the parts of the piston being retained in position on the piston rod by means of nuts 25, working on the threaded end 20. A suitable packing washer 26 is interposed between the end head 11 and the contiguous end of the casing 10.

In practice, to assemble the device the piston is connected to the piston rod 17, and inserted into the casing 10. The end heads 11 and 12 are then secured in position, the tension rods 13 and nuts 14 serving to draw all of the parts together so as to make the joints absolutely tight. When it is desired to charge the device, the piston is moved as close to the end head 11 as possible, and the nozzle 16 is inserted below the surface of the lubricant with which the casing 10 is to be filled. By drawing back the piston the lubricant is drawn into the receptacle by the suction created by the washer 22 and the spring cup 23. When it is desired to expel the contents of the receptacle 10, the piston is moved in the other direction, the washer 22$^a$ and spring cup 23$^a$ maintaining a sufficiently close contact with the wall of the receptacle to insure that there will be no leakage around the piston. It will be noted that the head 11 is of concavo-convex form so as to reduce resistance to the passage of the lubricant as it enters the discharge tube 15.

By employing the threaded connections between the tube 15, and the end head 11, and between the nozzle 16 and the tube 15, these parts may be readily removed and replaced if they should become injured. It will be noted that by constructing the device of separable parts, any particular part which may be injured or rendered unfit for use, may be removed and replaced by a good part, without necessitating reconstruction of the whole device.

Having thus explained the nature of the invention and described an operative manner of constructing and using the same, although without attempting to set forth all of the forms in which it may be made, or all of the forms of its use, what is claimed is:—

1. In a grease gun a piston cup of flexible material adapted to be movably mounted in a grease gun cylinder, a metal reenforcing cup located within the piston cup and provided with parallel slits forming spring tongues, the ends of said tongues being curved outwardly at approximately right angles to maintain a substantially continuous outwardly acting backing for said piston cup, and a piston rod engaging said cups.

2. In a grease gun, a piston cup of flexible material adapted to be movably mounted in a grease gun cylinder, a metal reenforcing cup located within the piston cup and having a wall approximately parallel with the wall of the piston cup, the peripheral edge of said reenforcing cup wall being curved outwardly approximately at right angles with respect to the wall proper and into engagement with the inner surface of the approximately cylindrical piston cup wall, said reenforcing cup being provided with slits forming spring tongues which provide a substantially continuous outwardly acting backing for said piston cup.

In testimony whereof I have hereunto set my hand.

FREDERICK T. RUNDELL.